US012565086B2

(12) United States Patent
Fukumoto

(10) Patent No.: US 12,565,086 B2
(45) Date of Patent: Mar. 3, 2026

(54) OFF-ROAD VEHICLE

(71) Applicant: KAWASAKI MOTORS, LTD., Hyogo (JP)

(72) Inventor: Akihiro Fukumoto, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/437,383

(22) Filed: Feb. 9, 2024

(65) Prior Publication Data

US 2025/0256554 A1     Aug. 14, 2025

(51) Int. Cl.
| | |
|---|---|
| *B60J 5/04* | (2006.01) |
| *B60J 10/86* | (2016.01) |
| *E05D 3/02* | (2006.01) |

(52) U.S. Cl.
CPC ............. *B60J 5/047* (2013.01); *B60J 5/0486* (2013.01); *B60J 10/86* (2016.02); *E05D 3/02* (2013.01); *E05Y 2900/531* (2013.01)

(58) Field of Classification Search
CPC . B60J 5/047; B60J 5/0486; B60J 10/86; B60J 5/0487; E05Y 2900/531; E05D 3/02
USPC .................................................. 49/490.1, 502
See application file for complete search history.

(56) References Cited

U.S. PATENT DOCUMENTS

| | | | | | |
|---|---|---|---|---|---|
| 5,067,201 | A | * | 11/1991 | Marchione | .......... E05D 11/1085 16/270 |
| 10,632,823 | B1 | * | 4/2020 | Osorio | ................... B60J 5/0416 |

| | | | | | |
|---|---|---|---|---|---|
| 11,718,159 | B1 | * | 8/2023 | Mascadri | ............... B60J 5/0487 296/146.1 |
| 2016/0280049 | A1 | * | 9/2016 | Yamamoto | ............ E05B 15/022 |
| 2019/0256154 | A1 | * | 8/2019 | Kamimura | ............. B62D 25/04 |
| 2020/0207192 | A1 | * | 7/2020 | Osorio | ................... B62D 25/04 |
| 2020/0207421 | A1 | * | 7/2020 | Osorio | ..................... B60N 3/02 |
| 2020/0346526 | A1 | * | 11/2020 | Cotnoir | ................. B60J 5/0406 |
| 2022/0234431 | A1 | * | 7/2022 | Shimada | ................. B60J 10/86 |
| 2022/0315115 | A1 | | 10/2022 | Lyons et al. | |

FOREIGN PATENT DOCUMENTS

| | | | | | | |
|---|---|---|---|---|---|---|
| CN | 117400705 | A | * | 1/2024 | | |
| DE | 20115377 | U1 | * | 1/2002 | .......... | B23K 1/0008 |
| EP | 1418074 | A2 | * | 5/2004 | .......... | B60J 5/0479 |
| GB | 2326382 | A | * | 12/1998 | .......... | B60J 5/0458 |
| JP | S6236817 | U | * | 3/1987 | | |
| JP | S63173828 | U | * | 11/1988 | | |
| JP | H10109662 | A | * | 4/1998 | | |
| JP | 2001151152 | A | * | 6/2001 | .......... | E05D 5/0207 |
| JP | 2002103970 | A | * | 4/2002 | .......... | B60J 5/0477 |
| JP | 2004122874 | A | * | 4/2004 | | |
| KR | 20110016799 | A | * | 2/2011 | | |
| WO | WO-2008041473 | A1 | * | 4/2008 | .......... | B60R 13/04 |
| WO | WO-2017174452 | A1 | * | 10/2017 | .......... | B05C 5/0216 |

* cited by examiner

*Primary Examiner* — Gregory J Strimbu

(74) *Attorney, Agent, or Firm* — Studebaker Brackett PLLC

(57) ABSTRACT

A utility vehicle includes a front door and a rear door located in rear of the front door. A rear end portion of the front door overlaps with a front end portion of the rear door as viewed in a vehicle width direction, and is located outside in the vehicle width direction with respect to the front end portion of the rear door.

10 Claims, 8 Drawing Sheets

REAR   LEFT

RIGHT   FRONT

REAR     LEFT

RIGHT     FRONT

OFF-ROAD VEHICLE

FIELD

The technique disclosed here relates to an off-road vehicle.

BACKGROUND

U.S. Patent Application Publication No. 2022/0315115 discloses an off-road vehicle including a front door and a rear door located in rear of the front door. Part of a main body panel is located in a clearance between the rear end of the front door and the front end of the rear door.

SUMMARY

In a case where there is the clearance between the rear end of the front door and the front end of the rear door, there is a probability of the inside of a vehicle compartment being viewed from the outside through the clearance. For this reason, in some cases, an additional component for blocking the view, such as part of the above-described main body panel, is located in this clearance. In this case, the additional component is required, and therefore, a manufacturing cost may increase.

The technique disclosed here has been made in view of the above-described points, and an object thereof is to eliminate, without the need for an additional component, a probability of the inside of a vehicle compartment being viewed through a clearance between a front door and a rear door.

The off-road vehicle disclosed here includes a front door and a rear door located in rear of the front door. A rear end portion of the front door overlaps with a front end portion of the rear door as viewed in a vehicle width direction, and is located outside in the vehicle width direction with respect to the front end portion.

The off-road vehicle can eliminate, without the need for the additional component, a probability of the inside of the vehicle compartment being viewed through the clearance between the front door and the rear door.

DESCRIPTION OF EMBODIMENTS

Figure 1:
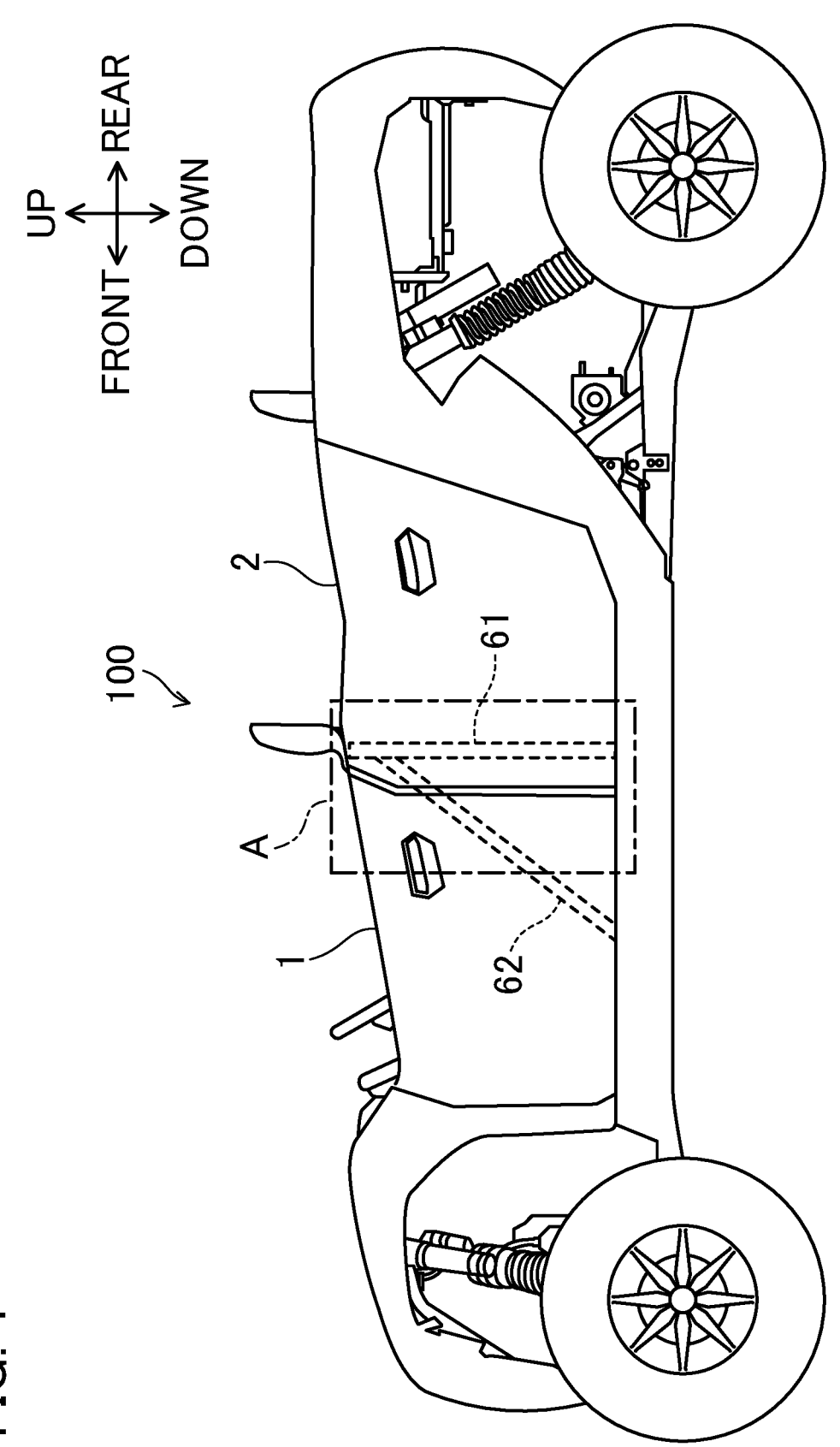
FIG. 1 is a side view of a utility vehicle.

Hereinafter, an exemplary embodiment will be described based on the drawings. FIG. 1 is a side view of a utility vehicle 100.

The utility vehicle 100 is a four-wheeled vehicle which can travel off road. The utility vehicle 100 is one example of an off-road vehicle. Hereinafter, the utility vehicle 100 will also be merely referred to as a "vehicle 100."

In the present disclosure, each component of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction." In the present disclosure, a member extending or expanding in a certain direction includes not only a member precisely extending or expanding parallel with a certain direction, but also a member substantially extending or expanding in a certain direction.

The vehicle 100 includes a front door 1 and a rear door 2 located in rear of the front door 1. The vehicle 100 may further include a B pillar 61, a protective frame 62, and a roll-over protection structure (ROPS). The B pillar 61 is a columnar member located in front of a rear seat. The B pillar 61 is located outside in the vehicle width direction with respect to a front seat. The B pillar 61 extends in an up-down direction. The B pillar 61 includes a pair of B pillars 61 located right and left. The protective frame 62 is located outside in the vehicle width direction with respect to the front seat. The protective frame 62 protects an occupant on the front seat from, e.g., external impact from the side. The protective frame 62 is inclined with respect to the up-down direction so as to be positioned higher as extending rearward. The upper end of the protective frame 62 is coupled to the B pillar 61. The lower end of the protective frame 62 is coupled, for example, to a lower frame extending in the front-rear direction in a lower portion of the vehicle 100. The ROPS is a frame structure which protects the occupant, e.g., when the vehicle 100 rolls over. The ROPS is attached to a vehicle body so as to surround a space above a vehicle compartment. Specifically, the ROPS is detachably attached to an upper end portion of the B pillar 61. Note that ROPS is not shown in FIG. 1 and FIG. 2 described later.

Figure 2:
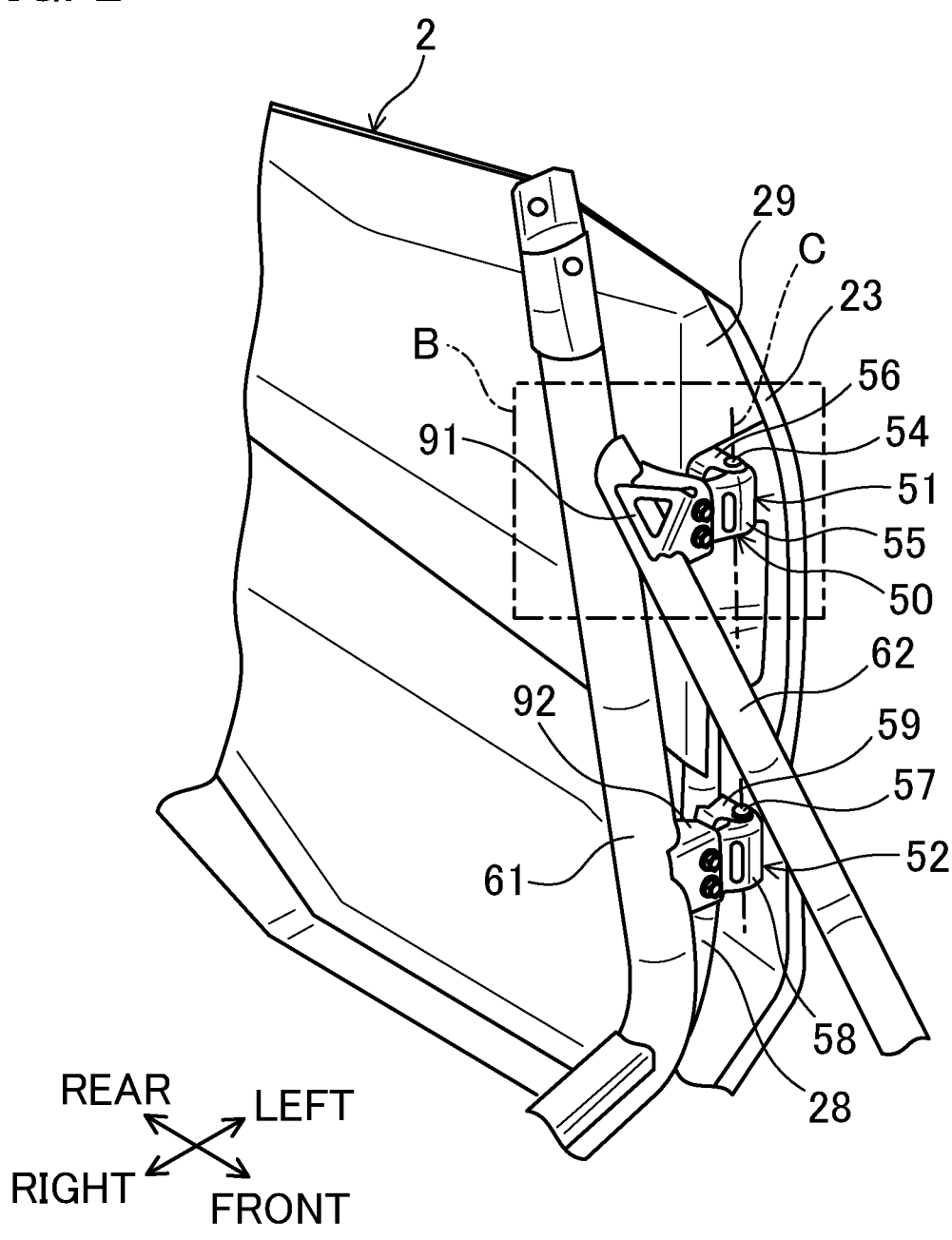
FIG. 2 is a perspective view of a coupled portion between a rear door and a B pillar from the inside of a vehicle compartment.

FIG. 2 is a perspective view of a coupled portion between the rear door 2 and the B pillar 61 from the inside of the vehicle compartment. The vehicle 100 further includes a hinge 50 supporting the rear door 2 such that the rear door 2 rotates about a predetermined rotation axis C. In this example, the hinge 50 includes a first hinge 51 and a second hinge 52 located below the first hinge 51.

Figure 3:
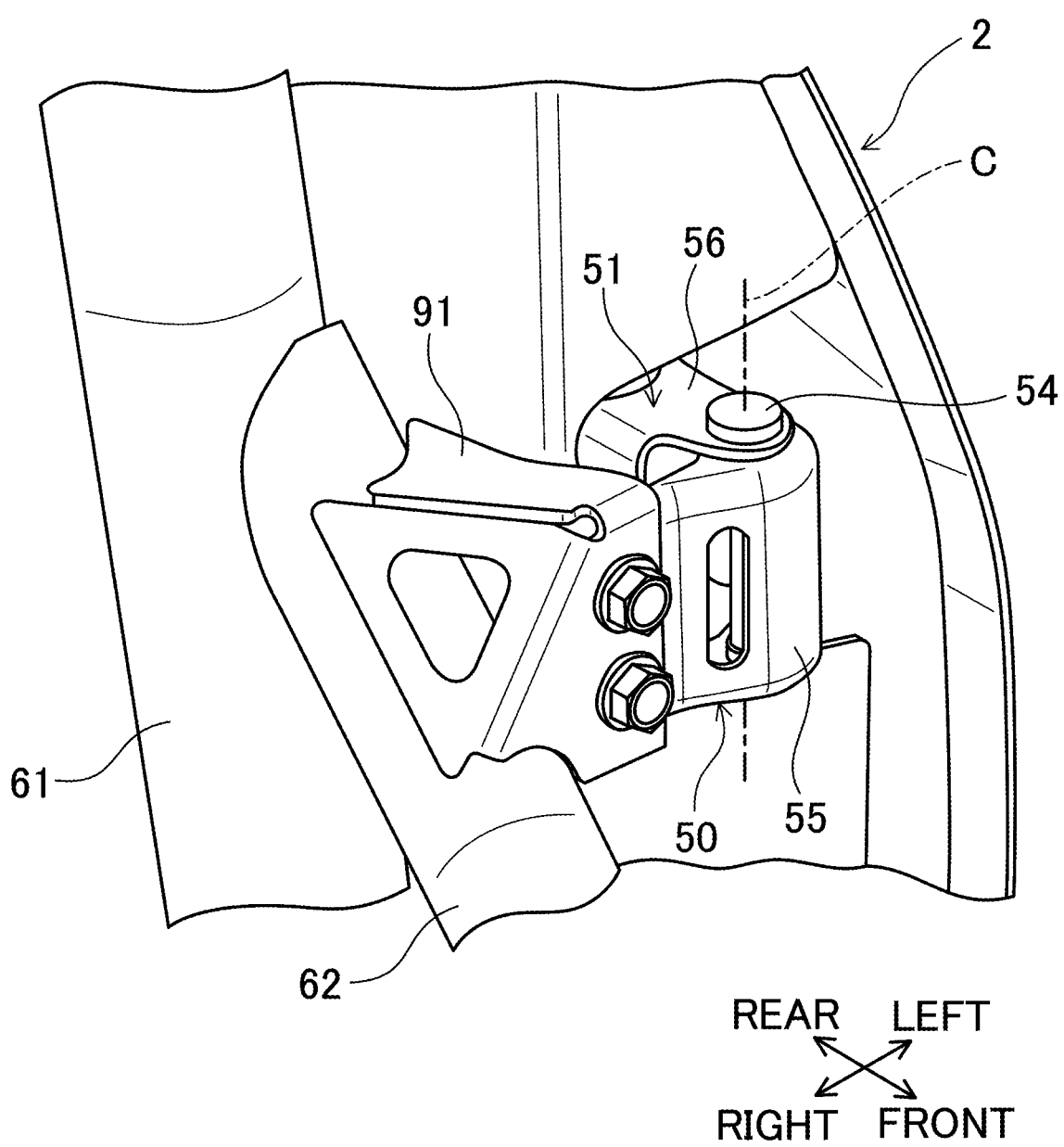
FIG. 3 is an enlarged view of a portion B of FIG. 2.
Figure 4:
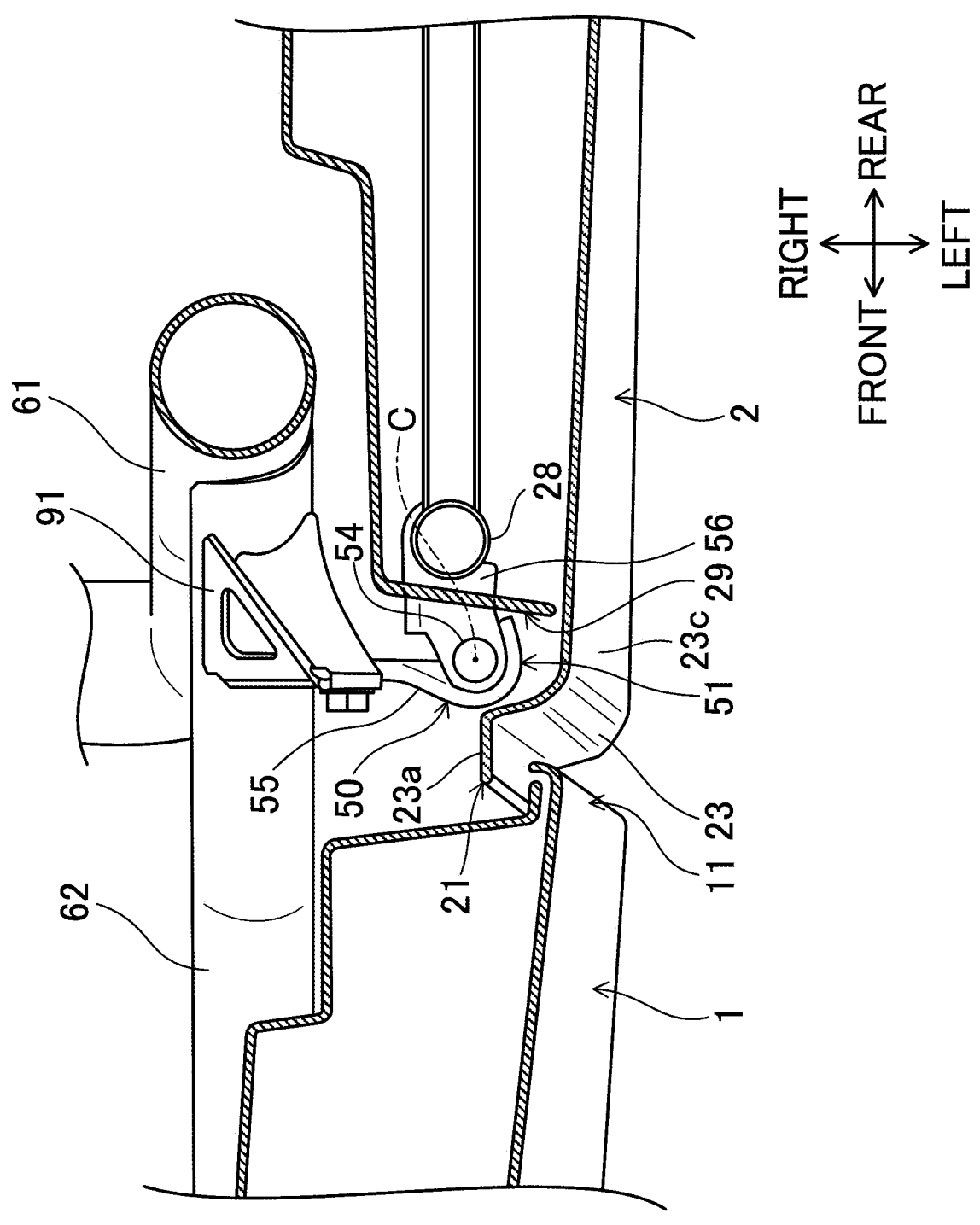
FIG. 4 is a sectional view of a front door, the rear door, and the B pillar taken along the horizontal plane when the section is viewed from above.

FIG. 3 is an enlarged view of a portion B of FIG. 2. The first hinge 51 has a first arm 55 attached to the protective frame 62 and a second arm 56 attached to the rear door 2. The first arm 55 and the second arm 56 are coupled to each other through a first shaft 54. The axis of the first shaft 54 is coincident with the rotation axis C. That is, the first arm 55 and the second arm 56 are rotatable about the rotation axis C. Specifically, the first arm 55 is attached to the B pillar 61 through a first bracket 91 and the protective frame 62. More specifically, the first arm 55 is bolted to the first bracket 91, for example. The first bracket 91 is attached to the protective frame 62, for example, by welding. As shown in FIG. 4, the second arm 56 is attached to a rear door frame 28 serving as the framework of the rear door 2. FIG. 4 is a sectional view of the front door 1, the rear door 2, and the B pillar 61 taken along the horizontal plane when such a section is viewed from above. The rear door frame 28 extends substantially in the up-down direction.

A basic configuration of the second hinge 52 is the same as the configuration of the first hinge 51. That is, as shown in FIG. 2, the second hinge 52 has a first arm 58 attached to the B pillar 61 and a second arm 59 attached to the rear door 2. The first arm 58 and the second arm 59 are coupled to each other through a second shaft 57. The axis of the second shaft 57 is coincident with the rotation axis C. That is, the first arm 58 and the second arm 59 are rotatable about the rotation axis C. Specifically, the first arm 58 is attached to the B pillar 61 through a second bracket 92. More specifically, the first arm 58 is attached to the second bracket 92, and the second bracket 92 is attached to the B pillar 61. The second arm 59 is attached to the rear door frame 28. With the above-described configuration, the rear door 2 is openably attached to the B pillar 61 through the first hinge 51 and the second hinge 52.

Figure 5:
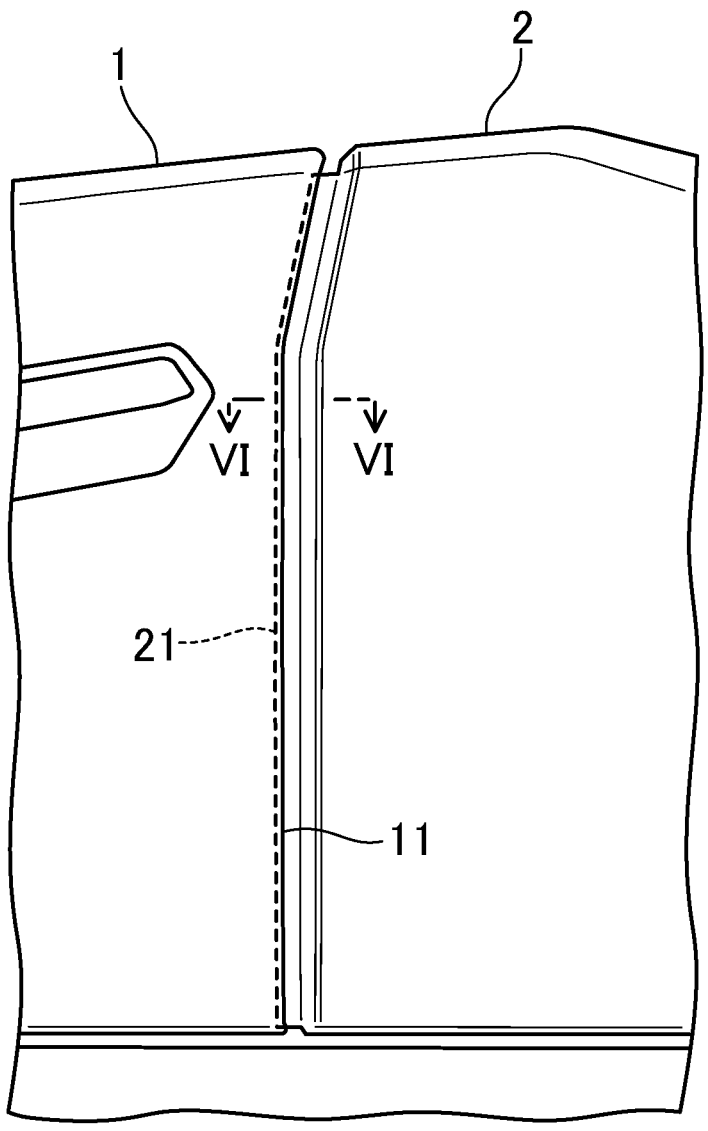
FIG. 5 is an enlarged view of a portion A of FIG. 1.
Figure 5:
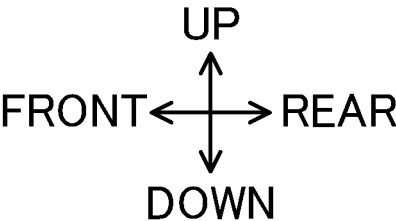

FIG. 5 is an enlarged view of a portion A of FIG. 1. A rear end portion 11 of the front door 1 overlaps with a front end portion 21 of the rear door 2 as viewed in the vehicle width direction, and is located outside in the vehicle width direction with respect to the front end portion 21. In this example, the rear end portion 11 of the front door 1 overlaps with the front end portion 21 of the rear door 2 as viewed in the vehicle width direction across the substantially entireties of the front door 1 and the rear door 2 in the up-down direction.

Figure 6:
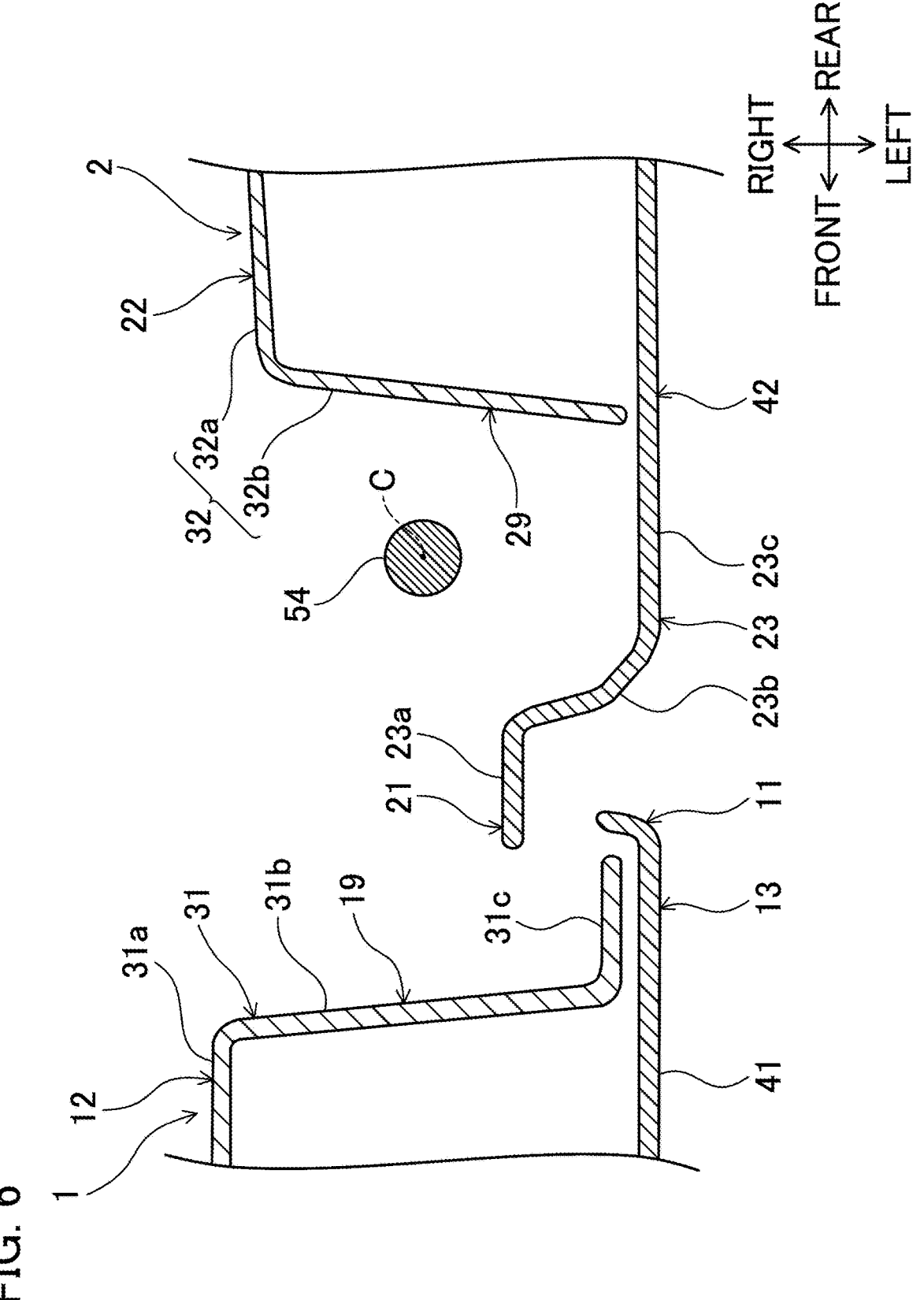
FIG. 6 is a sectional view taken along a VI-VI line of FIG. 5.

FIG. 6 is a sectional view taken along a VI-VI line of FIG. 5. Note that in FIG. 6, members other than the front door 1, the rear door 2, and the first shaft 54 are not shown for the sake of convenience in description. Specifically, the front door 1 has a front door body 12 and a first protruding piece 13 protruding rearward from the front door body 12 and including the rear end portion 11 of the front door 1. More specifically, the first protruding piece 13 protrudes rearward from the outer corner of the rear end of the front door body 12 in the vehicle width direction.

The front door body 12 is a body portion of the front door 1. The front door body 12 has a rear wall 19 facing rearward. The rear wall 19 expands substantially in the up-down direction and the vehicle width direction.

The first protruding piece 13 is entirely in a plate shape (specifically, flat plate shape). The first protruding piece 13 expands in the up-down direction and the front-rear direction.

Specifically, the front door 1 includes a first inner panel 31 and a first outer panel 41. The first inner panel 31 is located inside in the vehicle width direction with respect to the first outer panel 41. The first inner panel 31 includes a first wall 31*a*, a second wall 31*b*, and a third wall 31*c*. Each of the first wall 31*a* and the third wall 31*c* expands in the front-rear direction and the up-down direction. The second wall 31*b* expands substantially in the vehicle width direction and the up-down direction. The second wall 31*b* serves as the above-described rear wall 19. The rear end of the first wall 31*a* is coupled to the inner end of the second wall 31*b* in the vehicle width direction. The outer end of the second wall 31*b* in the vehicle width direction is coupled to the front end of the third wall 31*c*. The first outer panel 41 expands substantially in the front-rear direction and the up-down direction. In this example, a rear end portion of the first outer panel 41 is bent inward in the vehicle width direction. The first wall 31*a* and second wall 31*b* of the first inner panel 31 and a portion of the first outer panel 41 positioned in front with respect to the rear wall 19 define the above-described front door body 12. The third wall 31*c* of the first inner panel 31 and a portion of the first outer panel 41 positioned in rear with respect to the rear wall 19 define the above-described first protruding piece 13.

The rear door 2 has a rear door body 22 and a second protruding piece 23 protruding forward from the rear door body 22 and including the front end portion 21 of the rear door 2. Specifically, the second protruding piece 23 protrudes forward from the outer corner of the front end of the rear door body 22 in the vehicle width direction.

The rear door body 22 is a body portion of the rear door 2. The rear door body 22 has a front wall 29 facing forward. The front wall 29 expands substantially in the up-down direction and the vehicle width direction.

The second protruding piece 23 is entirely in a plate shape. Specifically, the second protruding piece 23 includes a first portion 23*a*, a second portion 23*b*, and a third portion 23*c*. The third portion 23*c* expands in the front-rear direction and the up-down direction. The rear end of the third portion 23*c* is coupled to the outer corner of the front end of the rear door body 22 in the vehicle width direction. The second portion 23*b* is inclined with respect to the vehicle width direction so as to be positioned inside in the vehicle width direction as extending forward. The rear end of the second portion 23*b* is coupled to the front end of the third portion 23*c*. The first portion 23*a* expands in the front-rear direction and the up-down direction. The rear end of the first portion 23*a* is coupled to the front end of the second portion 23*b*. The first portion 23*a* includes the front end portion 21 of the rear door 2 described above. That is, the first portion 23*a* overlaps with the rear end portion 11 of the front door 1 as viewed in the vehicle width direction. The first portion 23*a* is one example of a "front end portion of a second protruding piece."

Specifically, the rear door 2 includes a second inner panel 32 and a second outer panel 42. The second inner panel 32 is located inside in the vehicle width direction with respect to the second outer panel 42. The second inner panel 32 includes a fourth wall 32*a* and a fifth wall 32*b*. The fourth wall 32*a* expands in the front-rear direction and the up-down direction. The fifth wall 32*b* expands substantially in the vehicle width direction and the up-down direction. The fifth wall 32*b* is the above-described front wall 29. The front end of the fourth wall 32*a* is coupled to the inner end of the fifth wall 32*b* in the vehicle width direction. The second outer panel 42 entirely expands in the front-rear direction and the up-down direction. A portion of the second outer panel 42 positioned in rear with respect to the front wall 29 and the second inner panel 32 define the above-described rear door body 22. A portion of the second outer panel 42 positioned in front with respect to the front wall 29 defines the above-described second protruding piece 23.

With the above-described configuration, in terms of a position in the vehicle width direction, the first portion 23*a* of the second protruding piece 23 is located inside in the vehicle width direction with respect to the outer surface of the rear door body 22. The first portion 23*a* of the second protruding piece 23 is positioned inside in the vehicle width direction with respect to the first protruding piece 13. In this example, the first portion 23*a* of the second protruding piece 23 and the first protruding piece 13 are separated from each other in the vehicle width direction. That is, in this example, the rear end portion 11 of the front door 1 and the front end portion 21 of the rear door 2 are separated from each other in the vehicle width direction.

Subsequently, a positional relationship between the front end portion 21 of the rear door 2, the rotation axis C of the hinge 50, and the B pillar 61 will be described. As shown in FIG. 4, in terms of a position in the front-rear direction, the front end portion 21 of the rear door 2 is positioned in front with respect to the B pillar 61. In terms of a position in the vehicle width direction, the front end portion 21 of the rear door 2 is positioned outside in the vehicle width direction with respect to the B pillar 61. In this example, in terms of a position in the front-rear direction, the second protruding piece 23 of the rear door 2 extends to a position in front with respect to the B pillar 61. In terms of a position in the vehicle width direction, the second protruding piece 23 of the rear door 2 is positioned outside in the vehicle width direction with respect to the B pillar 61.

The rotation axis C of the hinge 50 is located between the first portion 23a of the second protruding piece 23 and the front wall 29 in terms of a position in the front-rear direction. That is, the rotation axis C is located inside in the vehicle width direction with respect to the second protruding piece 23. In terms of a position in the vehicle width direction, the rotation axis C is positioned outside in the vehicle width direction with respect to the B pillar 61. In this example, in terms of a position in the front-rear direction, the rotation axis C is positioned in front with respect to the B pillar 61.

In this vehicle 100, the rear end portion 11 of the front door 1 overlaps with the front end portion 21 of the rear door 2 as viewed in the vehicle width direction. Thus, a probability of the inside of the vehicle compartment being viewed through a clearance between the front door 1 and the rear door 2 can be eliminated without the need for an additional component. Particularly in this example, the front door 1 includes the first protruding piece 13 protruding rearward from the front door body 12, and therefore, the rear end portion 11 of the front door 1 can easily overlap with the front end portion 21 of the rear door 2 as viewed in the vehicle width direction. Further, the rear door 2 includes the second protruding piece 23 protruding forward from the rear door body 22, and therefore, the front end portion 21 of the rear door 2 can easily overlap with the rear end portion 11 of the front door 1 as viewed in the vehicle width direction.

Figure 7:
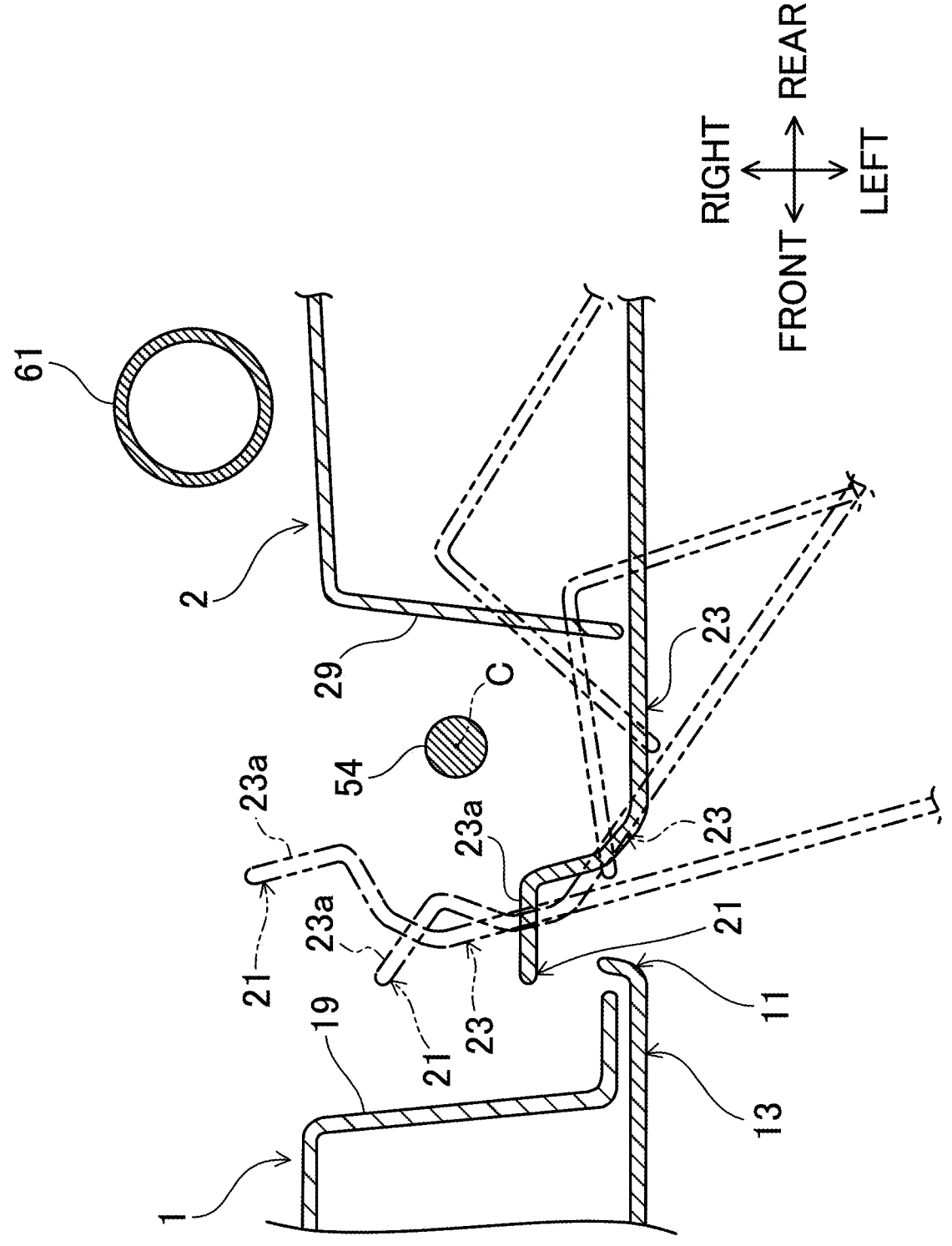
FIG. 7 is a sectional view of the rear door, a shaft, and the B pillar taken along the horizontal plane when the section is viewed from above, and shows the behavior of the rear door upon opening and closing.

FIG. 7 is a sectional view of the rear door 2, a shaft 54, and the B pillar 61 taken along the horizontal plane when such a section is viewed from above, and shows the behavior of the rear door 2 upon opening and closing. In FIG. 7, a solid line indicates the state of the rear door 2 when the rear door 2 is fully closed, and a dash-dot-dot line indicates the state of the rear door 2 when the rear door 2 is fully opened and while the rear door 2 is being opened or closed. When the rear door 2 (specifically, left rear door 2) is opened, the front end portion 21 (specifically, first portion 23a of the second protruding piece 23) of the rear door 2 rotates clockwise about the rotation axis C as viewed from above. That is, when the rear door 2 is opened, the front end portion 21 (specifically, first portion 23a of the second protruding piece 23) of the rear door 2 moves inward in the vehicle width direction. In the vehicle 100, the rear end portion 11 of the front door 1 is located outside in the vehicle width direction with respect to the front end portion 21 of the rear door 2, and therefore, contact of the front end portion 21 with the rear end portion 11 upon opening of the rear door 2 can be avoided. In this example, the first portion 23a of the second protruding piece 23 is positioned inside in the vehicle width direction with respect to the first protruding piece 13 of the front door 1. Thus, contact of the second protruding piece 23 with the first protruding piece 13 upon opening of the rear door 2 can be avoided.

Further, in the vehicle 100, the front end portion 21 of the rear door 2 is positioned in front with respect to the B pillar 61 in terms of a position in the front-rear direction, and the front end portion 21 is positioned outside in the vehicle width direction with respect to the B pillar 61 in terms of a position in the vehicle width direction. With this configuration, contact of the front end portion 21 with the B pillar 61 can be avoided when the rear door 2 is opened or closed even if the front end portion 21 moves inward in the vehicle width direction.

As described above, the first portion 23a of the second protruding piece 23 moves inward in the vehicle width direction when the rear door 2 is opened. In the vehicle 100, the rotation axis C of the hinge 50 is located between the first portion 23a of the second protruding piece 23 and the front wall 29 in terms of a position in the front-rear direction. That is, the rotation axis C is not located in a space inside in the vehicle width direction with respect to the first portion 23a of the second protruding piece 23. Thus, interfering of the second protruding piece 23 with the rotation axis C upon opening of the rear door 2 can be avoided.

In addition, in the vehicle 100, in terms of a position in the vehicle width direction, the first portion 23a of the second protruding piece 23 is located inside in the vehicle width direction with respect to the outer surface of the rear door body 22. With this configuration, even in a state in which the rear end portion 11 of the front door 1 overlaps with the front end portion 21 of the rear door 2 as viewed in the vehicle width direction, the outer surface of the rear door body 22 and the outer surface of the front door body 12 can be located in the same plane.

Figure 8:
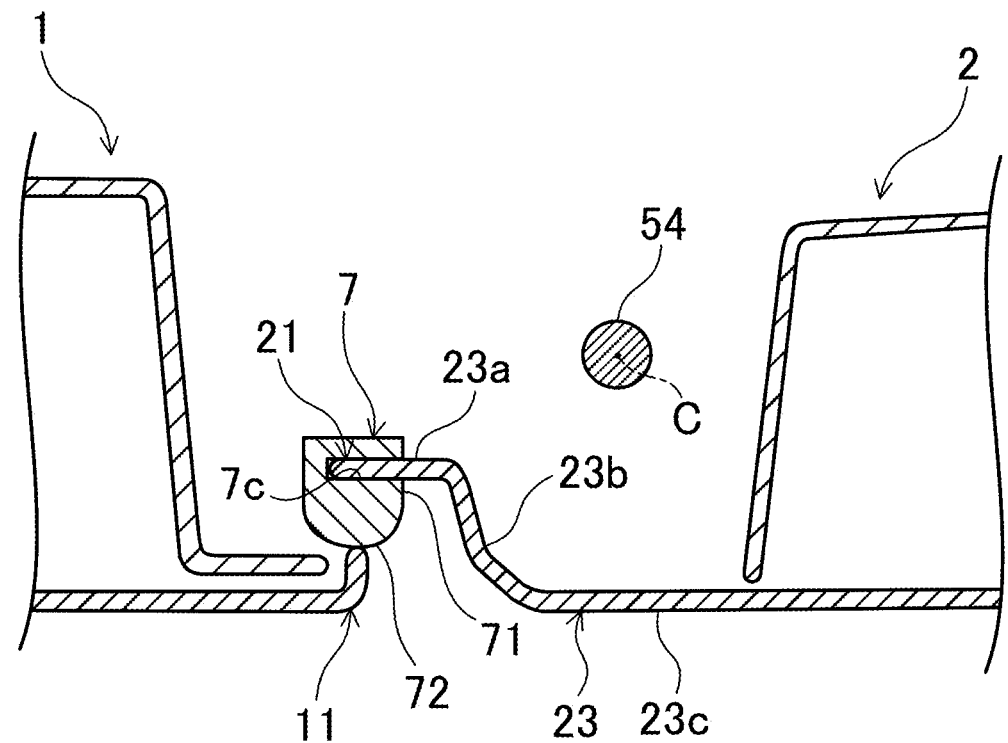
FIG. 8 is a sectional view for describing a sealant of an off-road vehicle according to a modification.
Figure 8:
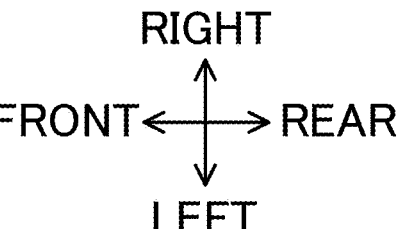

Next, a vehicle 200 according to a modification will be described. FIG. 8 is a sectional view for describing a sealant 7 of the vehicle 200 according to the modification. The vehicle 200 is different from the vehicle 100 in that the vehicle 200 has the sealant 7. Other configurations are the same as those of the vehicle 100. The same reference numerals as those of the vehicle 100 are used, and description thereof will be omitted.

The vehicle 200 further includes the sealant 7 located between the front end portion 21 of the rear door 2 and the rear end portion 11 of the front door 1 and attached to the front end portion 21. The sealant 7 is made, for example, of rubber. Specifically, the sealant 7 extends substantially in the up-down direction along the front end portion 21. That is, the shape of the sealant 7 is a columnar shape extending substantially in the up-down direction along the front end portion 21. The sealant 7 has a groove 7c in an end surface 71 facing rearward. The groove 7c extends substantially in the up-down direction. The second protruding piece 23 (specifically, first portion 23a) of the rear door 2 is fitted in the groove 7c. Thus, the sealant 7 is attached to the front end portion 21 of the rear door 2. That is, the sealant 7 rotates about the rotation axis C integrally with the front end portion 21 upon opening and closing of the rear door 2. A portion of the sealant 7 outside in the vehicle width direction with respect to the groove 7c is located between the front end portion 21 of the rear door 2 and the rear end portion 11 of the front door 1. An end surface 72 of the sealant 7 facing outward in the vehicle width direction is curved such that a center portion thereof in the front-rear direction protrudes outward in the vehicle width direction. In this example, when at least the rear door 2 is closed, the end surface 72 of the sealant 7 contacts the rear end portion 11 of the front door 1.

The vehicle 200 has the sealant 7, and therefore, entrance of dust into the vehicle compartment through a clearance between the front end portion 21 of the rear door 2 and the rear end portion 11 of the front door 1 can be prevented. Particularly in this example, the end surface 72 of the sealant 7 contacts the rear end portion 11 of the front door 1 when at least the rear door 2 is closed, and therefore, entrance of dust into the vehicle compartment through the above-described clearance can be more reliably prevented. Further, the end surface 72 of the sealant 7 is curved such that the center portion thereof in the front-rear direction protrudes outward in the vehicle width direction. Thus, even in a case where the end surface 72 of the sealant 7 contacts the rear end portion 11 of the front door 1, the sealant 7 does not interfere with an operation of opening and closing the rear door 2.

OTHER EMBODIMENTS

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle is not limited to the utility vehicle 100. The off-road vehicle may be, for example, an all terrain vehicle (ATV) or a tractor. Moreover, the off-road vehicle is not limited to a four-wheeled vehicle, and for example, may be a three-wheeled vehicle.

In the vehicle 100, the rear end portion 11 of the front door 1 overlaps with the front end portion 21 of the rear door 2 as viewed in the vehicle width direction across the substantially entireties of the front door 1 and the rear door 2 in the up-down direction. However, the rear end portion 11 of the front door 1 may not overlap with the front end portion 21 of the rear door 2 as viewed in the vehicle width direction at part of the front door 1 and the rear door 2 in the up-down direction.

As long as the rear end portion 11 of the front door 1 overlaps with the front end portion 21 of the rear door 2 as viewed in the vehicle width direction and is located outside in the vehicle width direction with respect to the front end portion 21, the configurations of the front door 1 and the rear door 2 are not limited. For example, the front door 1 does not necessarily include the first protruding piece 13. In this case, a rear end portion of the front door body 12 may overlap with the front end portion 21 of the rear door 2 as viewed in the vehicle width direction. The rear door 2 does not necessarily include the second protruding piece 23. In this case, the rear end portion 11 of the front door 1 may overlap with a front end portion of the rear door body 22 as viewed in the vehicle width direction. The rear end portion 11 of the front door 1 may contact the front end portion 21 of the rear door 2.

As long as the front end portion 21 of the rear door 2 does not contact the B pillar 61 upon opening and closing of the rear door 2, the front end portion 21 is not necessarily positioned in front with respect to the B pillar 61 in terms of a position in the front-rear direction, and is not necessarily positioned outside in the vehicle width direction with respect to the B pillar 61 in terms of a position in the vehicle width direction.

The rotation axis C of the hinge 50 is not necessarily located between the first portion 23a of the second protruding piece 23 and the front wall 29 in terms of a position in the front-rear direction.

In the vehicle 200 according to the modification, the sealant 7 is not necessarily attached to the front end portion 21 of the rear door 2 by fitting the second protruding piece 23 of the rear door 2 in the groove 7c. For example, the sealant 7 may be present only between the front end portion 21 of the rear door 2 and the rear end portion 11 of the front door 1, and the inner end surface of the sealant 7 in the vehicle width direction may be attached to the second protruding piece 23 with, e.g., an adhesive.

ASPECTS

The above-described embodiment is a specific example of the following aspects.

(First Aspect) The utility vehicle 100 (off-road vehicle) includes the front door 1 and the rear door 2 located in rear of the front door 1. The rear end portion 11 of the front door 1 overlaps with the front end portion 21 of the rear door 2 as viewed in the vehicle width direction, and is located outside in the vehicle width direction with respect to the front end portion 21 of the rear door 2.

According to this configuration, a probability of the inside of the vehicle compartment being viewed through the clearance between the front door 1 and the rear door 2 can be eliminated without the need for the additional component.

(Second Aspect) The utility vehicle 100 of the first aspect further includes the sealant 7 located between the front end portion 21 of the rear door 2 and the rear end portion 11 of the front door 1 and attached to the front end portion 21 of the rear door 2.

According to this configuration, entrance of dust into the vehicle compartment through the clearance between the front end portion 21 of the rear door 2 and the rear end portion 11 of the front door 1 can be prevented.

(Third Aspect) In the utility vehicle 100 of the first or second aspect, in terms of a position in the front-rear direction, the front end portion 21 of the rear door 2 is positioned in front with respect to the B pillar 61, and in terms of a position in the vehicle width direction, the front end portion 21 of the rear door 2 is positioned outside in the vehicle width direction with respect to the B pillar 61.

According to this configuration, contact of the front end portion 21 with the B pillar 61 upon opening and closing of the rear door 2 can be avoided.

(Fourth Aspect) In the utility vehicle 100 of any one of the first to third aspects, the front door 1 has the front door body 12 and the first protruding piece 13 protruding rearward from the front door body 12 and including the rear end portion 11 of the front door 1.

According to this configuration, the rear end portion 11 of the front door 1 can easily overlap with the front end portion 21 of the rear door 2 as viewed in the vehicle width direction.

(Fifth Aspect) In the utility vehicle 100 of any one of the first to fourth aspects, the rear door 2 has the rear door body 22 and the second protruding piece 23 protruding forward from the rear door body 22 and including the front end portion 21 of the rear door 2.

According to this configuration, the front end portion 21 of the rear door 2 can easily overlap with the rear end portion 11 of the front door 1 as viewed in the vehicle width direction.

(Sixth Aspect) In the utility vehicle 100 of any one of the first to fifth aspects, the front door 1 has the front door body 12 and the first protruding piece 13 protruding rearward from the front door body 12 and including the rear end portion 11 of the front door 1, the rear door 2 has the rear door body 22 and the second protruding piece 23 protruding forward from the rear door body 22 and including the front end portion 21 of the rear door 2, and the front end portion (first portion 23*a*) of the second protruding piece 23 is positioned inside in the vehicle width direction with respect to the first protruding piece 13.

According to this configuration, the front door 1 includes the first protruding piece 13 and the rear door 2 includes the second protruding piece 23, and therefore, the rear end portion 11 of the front door 1 and the front end portion 21 of the rear door 2 can more easily overlap with each other as viewed in the vehicle width direction.

(Seventh Aspect) In the utility vehicle 100 of any one of the first to sixth aspects, in terms of a position in the vehicle width direction, the front end portion (first portion 23*a*) of the second protruding piece 23 is located inside in the vehicle width direction with respect to the outer surface of the rear door body 22.

According to this configuration, even in a state in which the rear end portion 11 of the front door 1 overlaps with the front end portion 21 of the rear door 2 as viewed in the vehicle width direction, the outer surface of the rear door body 22 and the outer surface of the front door body 12 can be located in the same plane.

(Eighth Aspect) The utility vehicle 100 of any one of the first to seventh aspects further includes the hinge 50 supporting the rear door 2 such that the rear door 2 rotates about the predetermined rotation axis C. The rear door body 22 has the front wall 29 facing forward, and the rotation axis C is located between the front end portion (first portion 23*a*) of the second protruding piece 23 and the front wall 29 in terms of a position in the front-rear direction.

According to this configuration, the rotation axis C of the hinge 50 is not located in the space inside in the vehicle width direction with respect to the front end portion (first portion 23*a*) of the second protruding piece 23. Thus, interfering of the second protruding piece 23 with the rotation axis C upon opening and closing of the rear door 2 can be avoided.

What is claimed:

1. An off-road vehicle comprising:

a front door;

a rear door located in rear of the front door in a vehicle forward-reverse direction;

a B pillar extending in a vehicle up-down direction, a protective frame extending forward in the vehicle forward-reverse direction and downward in the vehicle up-down direction away from the B pillar, and a first hinge defining a predetermined rotation axis, mounted on the protective frame and supporting the rear door such that the rear door rotates about the predetermined rotation axis relative to the B pillar, wherein when the front and rear door are closed, a rear end portion of the front door overlaps with a front end portion of the rear door as viewed in a vehicle width direction, and is located outside in the vehicle width direction with respect to the front end portion.

2. The off-road vehicle of claim 1, further comprising:

a seal located between the front end portion of the rear door and the rear end portion of the front door and attached to the front end portion of the rear door.

3. The off-road vehicle of claim 1, wherein the front end portion of the rear door is positioned outside in the vehicle width direction with respect to the B pillar.

4. The off-road vehicle of claim 1, wherein the front door has a front door body and a first protruding piece protruding rearward from the front door body in the vehicle forward-reverse direction, the first protruding piece including the rear end portion of the front door.

5. The off-road vehicle of claim 1, wherein the rear door has a rear door body and a second protruding piece protruding forward from the rear door body in the vehicle forward-reverse direction, the second protruding piece including the front end portion of the rear door.

6. The off-road vehicle of claim 5, wherein the rear door body has a front wall facing forward towards the front door in the vehicle forward-reverse direction, and the rotation axis is located between the front end portion of the rear door and the front wall.

7. The off-road vehicle of claim 5, wherein the front end portion of the rear door is located inside in the vehicle width direction with respect to an outer surface of the rear door body.

8. The off-road vehicle of claim 1, wherein the front door has a front door body and a first protruding piece protruding rearward from the front door body in the vehicle forward-reverse direction, the first protruding piece including the rear end portion of the front door, the rear door has a rear door body and a second protruding piece protruding forward from the rear door body in the vehicle forward-reverse direction, the second protruding piece including the front end portion of the rear door, and the second protruding piece is positioned inside in the vehicle width direction with respect to the first protruding piece.

9. The off-road vehicle of claim 1, wherein the rear end portion of the front door is positioned forward of the B pillar in the vehicle forward-reverse direction.

10. The off-road vehicle of claim 1, comprising:

a second hinge rotatably supporting the rear door and located below the first hinge;

wherein the first hinge has a first arm attached to the protective frame and a second arm attached to the rear door;

wherein, the second hinge has a third arm attached to the B pillar and a fourth arm attached to the rear door.

* * * * *